United States Patent
Chen et al.

(10) Patent No.: US 10,712,466 B2
(45) Date of Patent: Jul. 14, 2020

(54) CASING THICKNESS MEASUREMENT USING ACOUSTIC WAVE CORRELATION

(71) Applicant: Halliburton Energy Services, Inc., Houston, TX (US)

(72) Inventors: Tianrun Chen, Sugar Land, TX (US); Yibing Zheng, West University Place, TX (US); Tatiana Gilstrap, The Woodlands, TX (US); Arthur Chuen Hon Cheng, Houston, TX (US); Robert Eric Epstein, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 334 days.

(21) Appl. No.: 14/413,404

(22) PCT Filed: Jul. 15, 2014

(86) PCT No.: PCT/US2014/046754
§ 371 (c)(1),
(2) Date: Jan. 7, 2015

(87) PCT Pub. No.: WO2015/023386
PCT Pub. Date: Feb. 19, 2015

(65) Prior Publication Data
US 2016/0231446 A1    Aug. 11, 2016

Related U.S. Application Data

(60) Provisional application No. 61/866,106, filed on Aug. 15, 2013.

(51) Int. Cl.
*G01V 1/48* (2006.01)
*G01V 1/44* (2006.01)
*E21B 47/08* (2012.01)

(52) U.S. Cl.
CPC .............. *G01V 1/48* (2013.01); *E21B 47/082* (2013.01); *G01V 1/44* (2013.01); *G01V 2210/542* (2013.01)

(58) Field of Classification Search
CPC .. G01V 1/40; G01V 1/48; E21B 47/00; E21B 47/16; E21B 47/0005
(Continued)

(56) References Cited

U.S. PATENT DOCUMENTS 4,255,798 A * 3/1981 Havira ................ E21B 47/0005
181/105
4,701,892 A    10/1987 Anderson
(Continued)

OTHER PUBLICATIONS

International Search Report and Written Opinion of the International Searching Authority issued in International Application No. PCT/US2014/046754 dated Nov. 21, 2014; 9 pages.
(Continued)

*Primary Examiner* — Eman A Alkafawi
(74) *Attorney, Agent, or Firm* — John W. Wustenberg; Parker Justiss, P.C.

(57) ABSTRACT

Systems, methods, and software for determining a thickness of a well casing are described. In some aspects, the thickness of the well casing is determined based on results of comparing a measured waveform and model waveforms. The measured waveform and model waveforms are generated based on operating an acoustic transmitter and an acoustic receiver within a wellbore comprising the well casing.

21 Claims, 11 Drawing Sheets

(58) Field of Classification Search
USPC .................................................. 702/6; 367/13
See application file for complete search history.

(56) References Cited

U.S. PATENT DOCUMENTS

| | | | | |
|---|---|---|---|---|
| 5,763,773 | A * | 6/1998 | Birchak | .............. E21B 47/0005 |
| | | | | 181/104 |
| 5,859,811 | A * | 1/1999 | Miller | ...................... G01V 1/48 |
| | | | | 367/25 |
| 6,041,861 | A | 3/2000 | Mandal et al. | |
| 7,184,594 | B1 * | 2/2007 | Yoshida | .............. G03F 7/70491 |
| | | | | 257/E23.179 |
| 8,061,206 | B2 | 11/2011 | Bolshakov et al. | |
| 2007/0019506 | A1 * | 1/2007 | Mandal | .................. G01N 29/11 |
| | | | | 367/117 |
| 2007/0285274 | A1 | 12/2007 | Esmersoy | |
| 2008/0112262 | A1 | 5/2008 | Tang et al. | |
| 2008/0189041 | A1 | 8/2008 | Froelich et al. | |
| 2010/0213943 | A1 | 8/2010 | Georgi et al. | |
| 2010/0263449 | A1 | 10/2010 | Bolshakov | |
| 2012/0041694 | A1 | 2/2012 | Stephens | |
| 2013/0155812 | A1 | 6/2013 | Froelich et al. | |

OTHER PUBLICATIONS

European Search Report issued by the European Patent Office in related European Application No. 14828120.7, dated Mar. 7, 2016.

* cited by examiner

US 10,712,466 B2

CASING THICKNESS MEASUREMENT USING ACOUSTIC WAVE CORRELATION

CLAIM OF PRIORITY

This application is a U.S. National Stage of International Application No. PCT/US2014/046754, filed Jul. 15, 2014, which claims priority to U.S. Provisional Application No. 61/866,106 filed on Aug. 15, 2013, the entire contents of which are hereby incorporated by reference.

BACKGROUND

This disclosure relates to measuring the thickness of a well casing of a well structure.

Cement evaluation techniques can be used to measure the thickness of a well casing installed inside of a well (e.g., oil well structures) using acoustic waves. The accuracy of casing thickness measurement is not only important for correctly assessing casing damage, but also is critical to evaluating the quality of cement bonding between the casing and a surrounding formation. These assessments are essential to the safety and economy of oil field operations.

DESCRIPTION OF DRAWINGS

Like reference symbols in the various drawings indicate like elements.

DETAILED DESCRIPTION

Figure 1A:
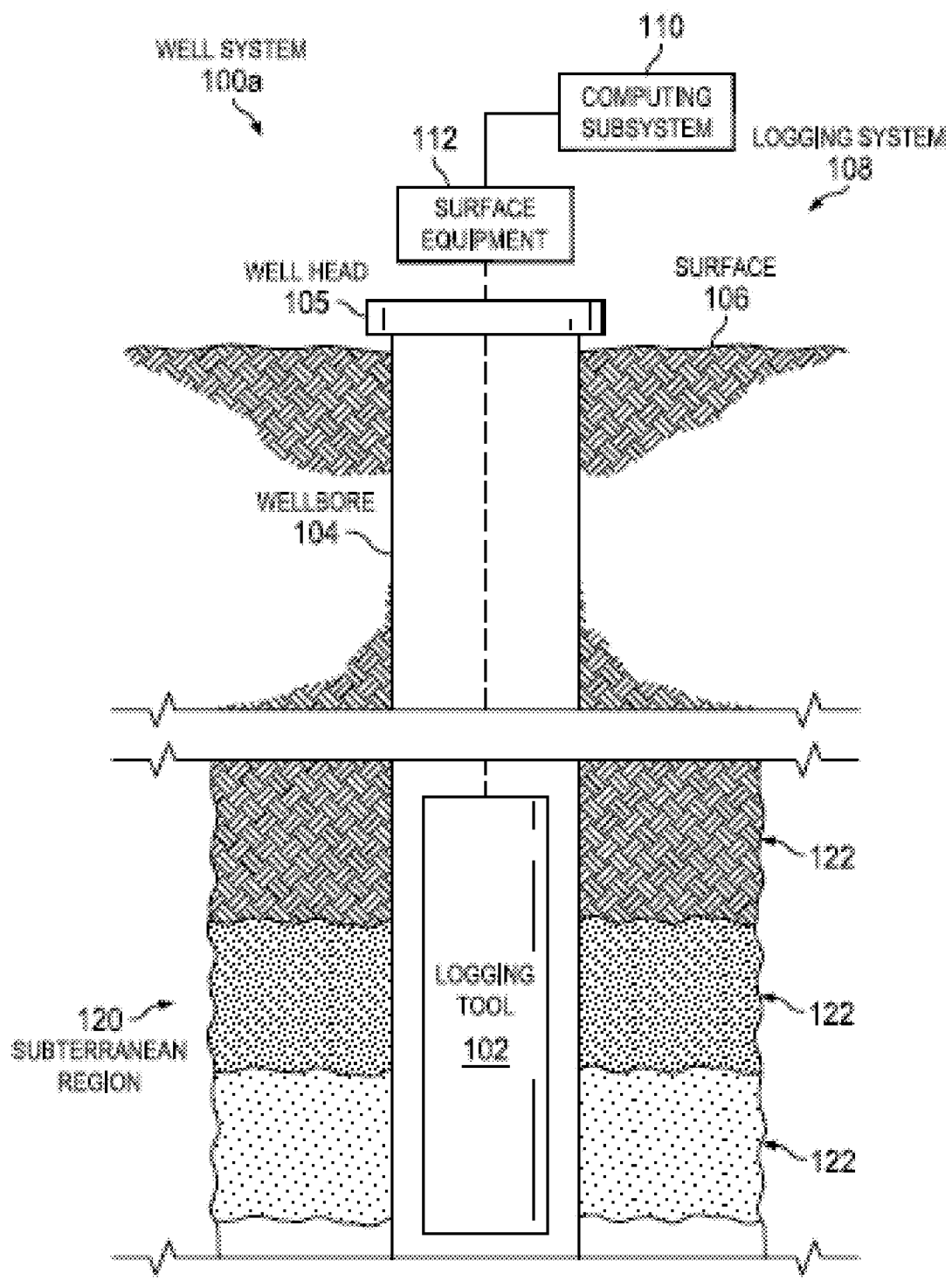
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of a logging system can be arranged and operated as represented in FIG. 1A or in another manner.

In some instances, all or part of the computing subsystem 110 can be implemented as a component of, or can be integrated with one or more components of, the surface equipment 112, the logging tool 102, or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allow communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
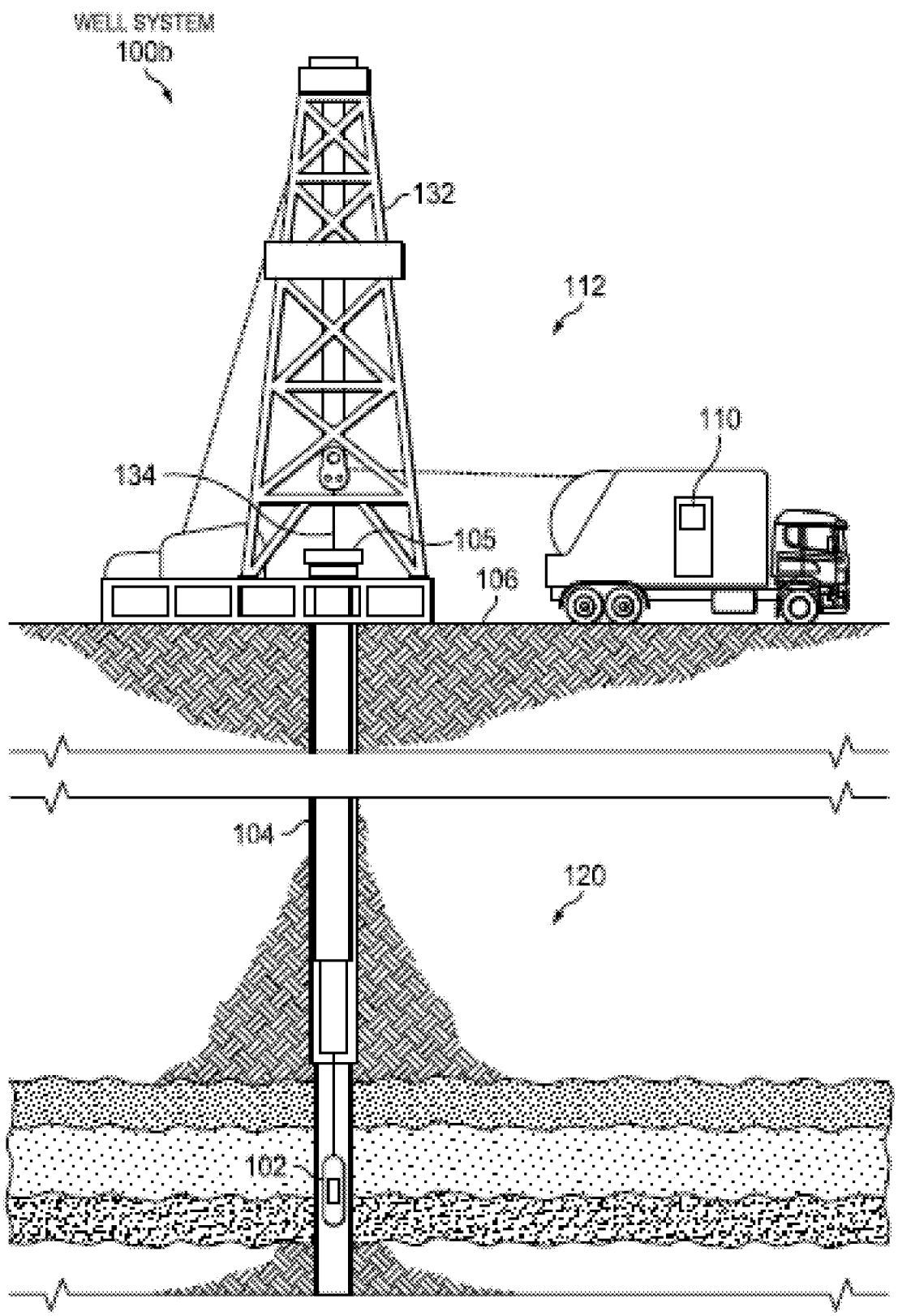
FIG. 1B is a diagram of an example well system that includes a logging tool in a wireline logging environment.

In some examples, logging operations are performed during wireline logging operations. FIG. 1B shows an example well system 100b that includes the logging tool 102 in a wireline logging environment. In some example wireline logging operations, the surface equipment 112 includes a platform above the surface 106 that is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
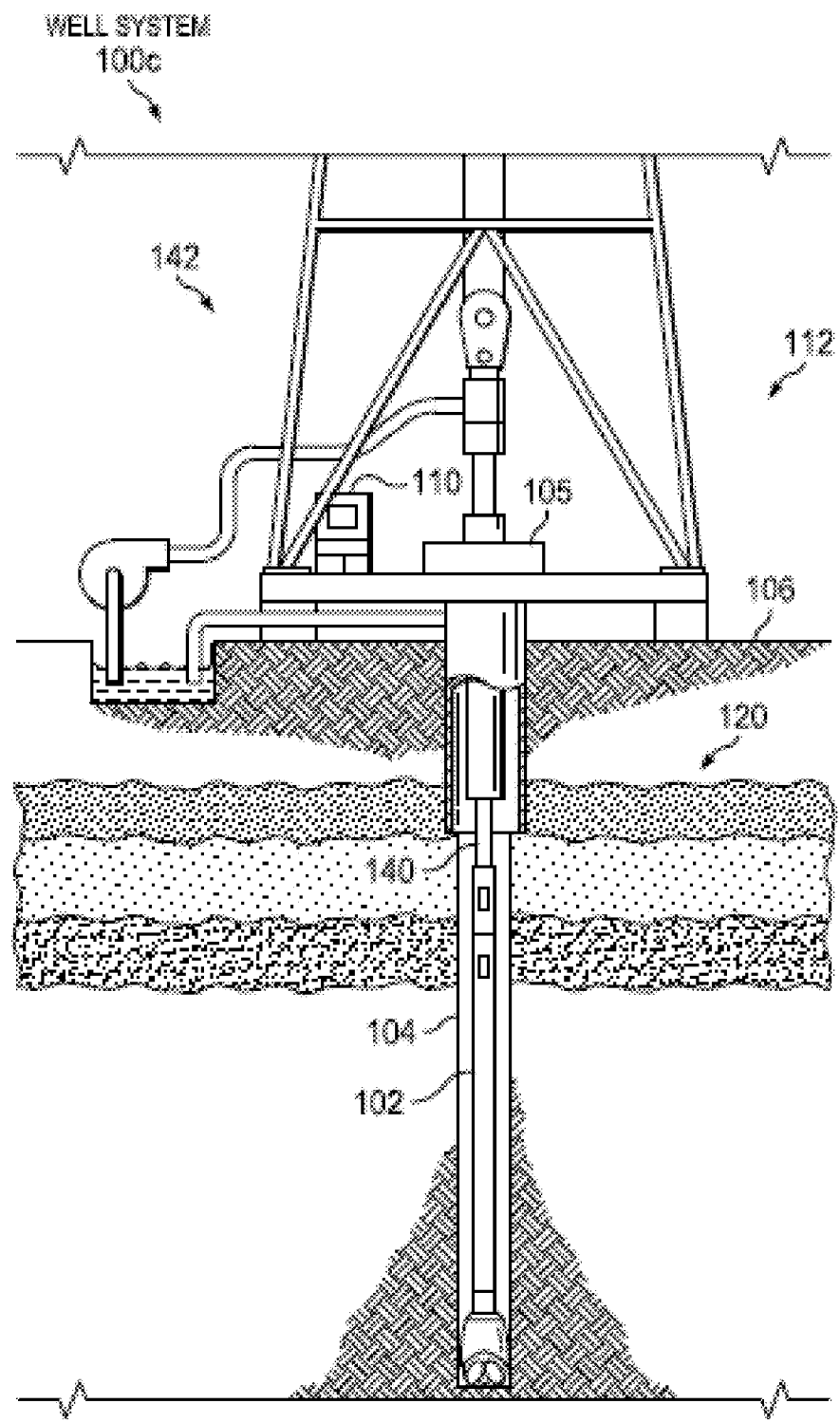
FIG. 1C is a diagram of an example well system that includes a logging tool in a logging while drilling (LWD) environment.

In some examples, logging operations are performed during drilling operations. FIG. 1C shows an example well system 100c that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

Figure 2:
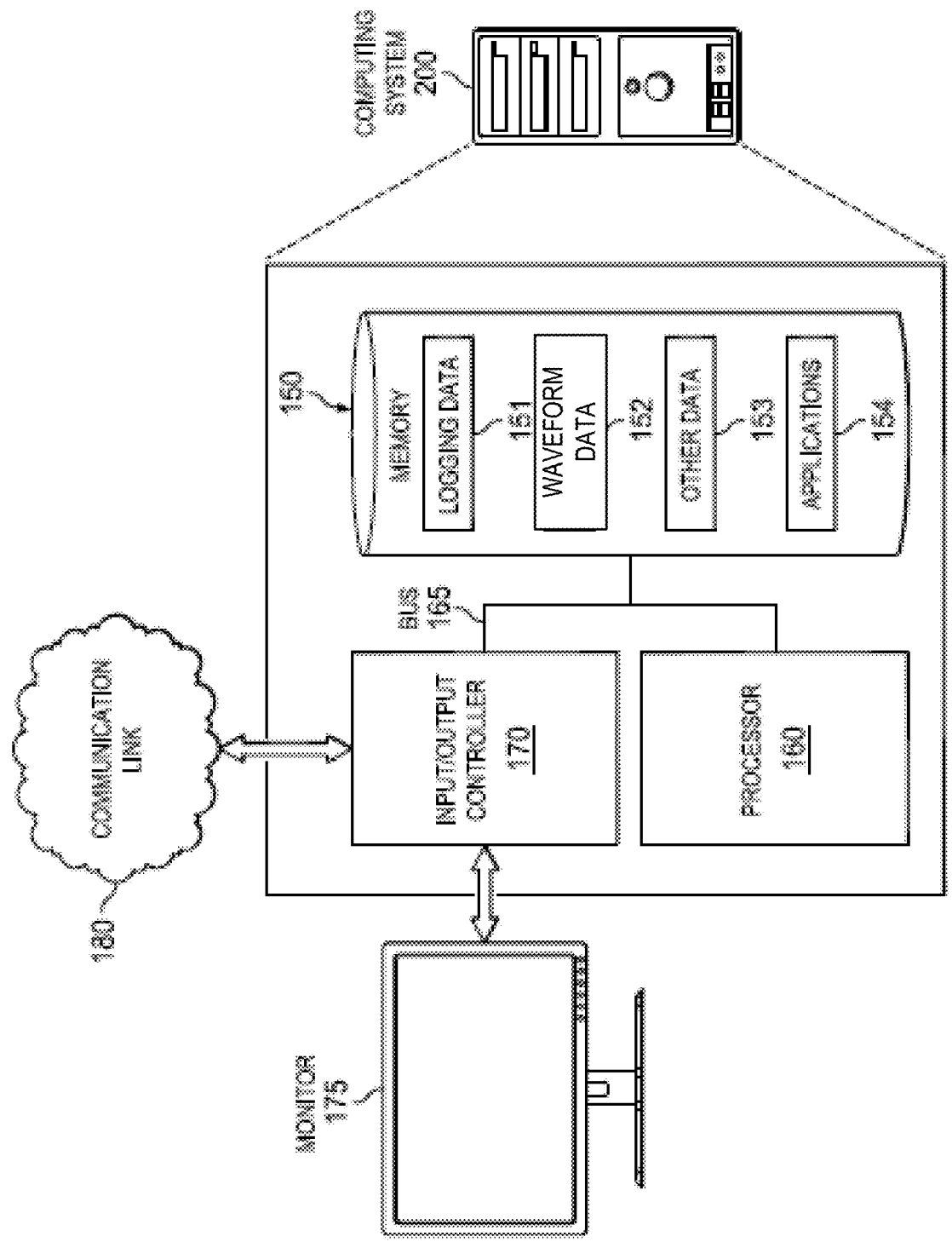
FIG. 2 is a diagram of an example computing system.

FIG. 2 is a diagram of the example computing system 200. The example computing system 200 can be used as the computing subsystem 110 of FIG. 1A, 1B, or 1C, or the example computing system 200 can be used in another manner. In some cases, the example computing system 200 can operate in connection with a well system (e.g., the well systems 100a, 100b, or 100c shown in FIG. 1A, 1B, or 1C) and be located at or near one or more wells of a well system or at a remote location. All or part of the computing system 200 may operate independent of a well system.

The example computing system 200 shown in FIG. 2 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner).

In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing system 200. As shown in FIG. 2, the example memory 150 includes logging data 151, waveform data 152, other data 153, and applications 154. The data and applications in the memory 150 can be stored in any suitable form or format.

The logging data 151 can include measurements and other data from a logging tool. In some cases, the logging data 151 include one or more measurements for each of multiple different logging points in a wellbore. For example, the logging point associated with a given measurement can be the location of the logging tool's reference point when the given measurement was acquired. Each measurement can include data obtained by one or more transmitter-receiver pairs operating at one or more signal frequencies. Each measurement can include data obtained by multiple transmitter-receiver pairs operating at one or more transmitter-receiver spacings. The logging data 151 can include information identifying a transmitter-receiver spacing associate with each measurement.

The waveform data 152 can include measured waveforms and model waveforms. The measured waveforms can be used to determine the thickness of a well casing. The model waveforms can correspond to different assumed or estimated thicknesses of the well casing. The waveform data 152 may include information associated with one or more logging points.

The other data 153 can include other information that is used by, generated by, or otherwise associated with the applications 154. For example, the other data 153 can include simulated data or other information that can be used by an engine to produce the waveform data 152 from the logging data 151.

The applications 154 can include software applications, scripts, programs, functions, executables, or other modules that are interpreted or executed by the processor 160. The applications 154 may include machine-readable instructions for performing one or more of the operations related to FIG. 9.

The applications 154 can obtain input data, such as logging data, simulation data, or other types of input data, from the memory 150, from another local source, or from one or more remote sources (e.g., via the communication link 180). The applications 154 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 154 by executing or interpreting the software, scripts, programs, functions, executables, or other modules contained in the applications 154. The processor 160 may perform one or more of the operations related to FIG. 9. The input data received by the processor 160 or the output data generated by the processor 160 can include any of the logging data 151, the waveform data 152, or the other data 153.

In some implementations, the logging tool 102 of FIGS. 1A, 1B, and 1C includes a casing inspection tool. Acoustic casing inspection tools and cement evaluation tools use transducers to emit acoustic waves into the well casing, the cement behind the casing, and the formation. The acoustic waves can be either body waves, such as compressional waves and shear waves, or surface waves. These acoustic waves travel inside the casing, cement, and formation, and are reflected and refracted/transmitted at each interface. The reflected and refracted/transmitted waves carry information about the casing thickness and cement bonding quality, and are recorded by either the original transducer or a second transducer for processing and interpretation (e.g., by an electronic processor of the tool). Measurements and/or processed data from the tool may be transmitted through a support cable to a surface control system, where they are reviewed by an operator. In some implementations, either additionally or alternatively, measurements may be stored within the tool (e.g., in a data storage device) for future retrieval, processing, and/or review at the surface. In one or more implementations, the measurements and/or processed data from the tool may be transmitted via other communication schemes (e.g. mud-pulse telemetry, wired pipe, electromagnetic telemetry, acoustic telemetry, and/or other telemetry schemes) used downhole.

Figure 3:
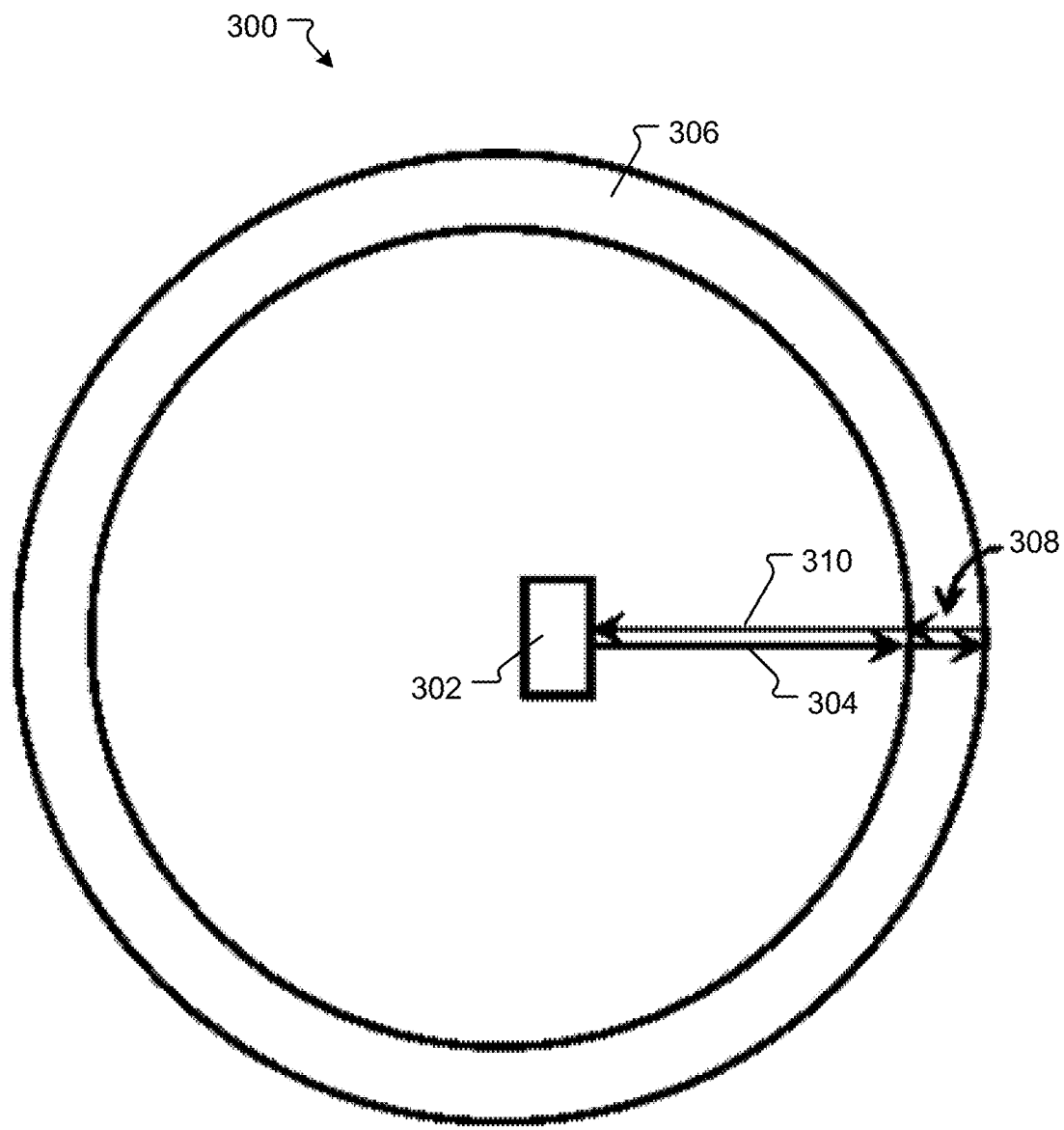
FIG. 3 shows an example tool having a one-transducer pulse-echo configuration.
Figure 4:
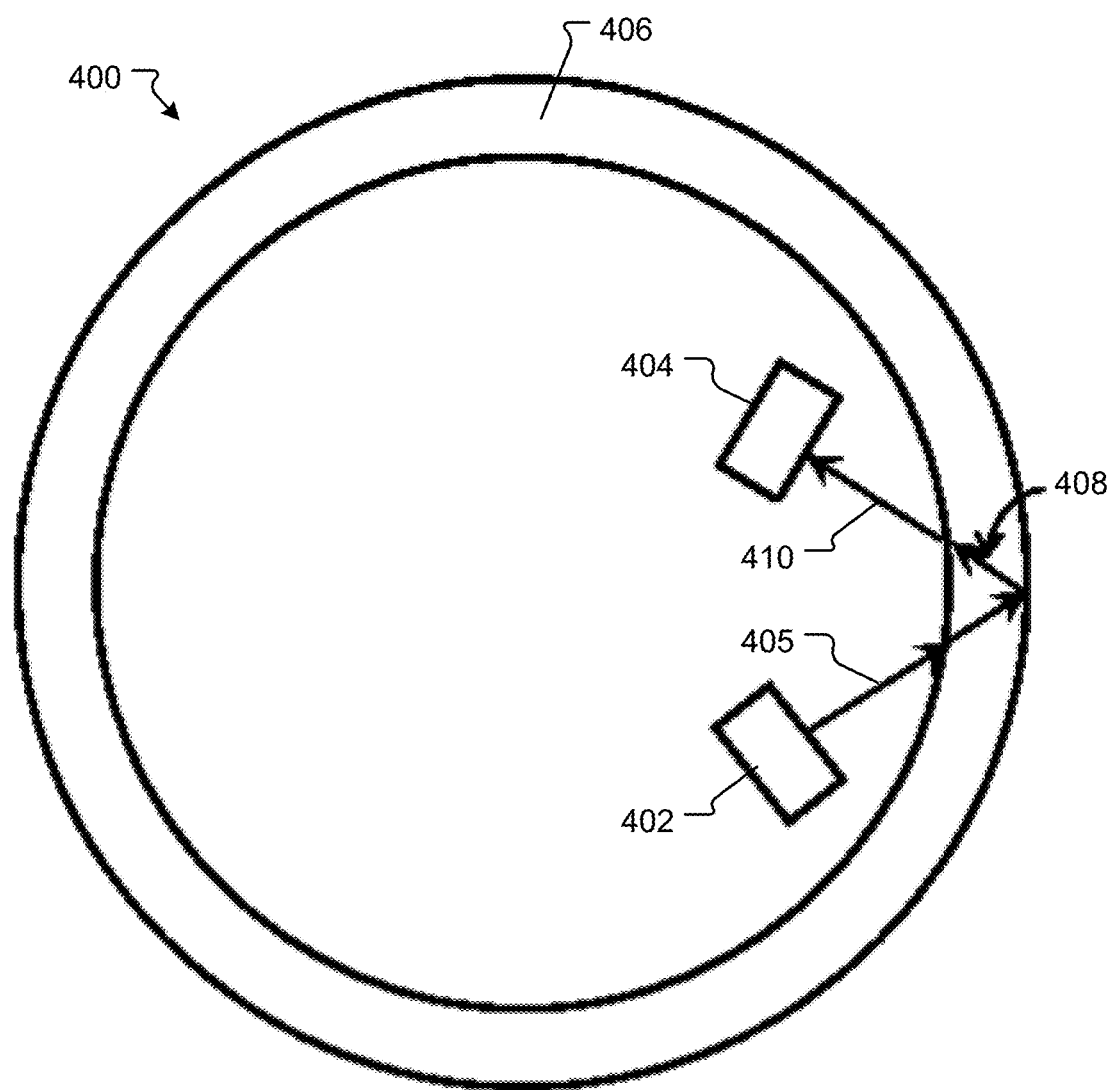
FIG. 4 shows an example tool having a two-transducer pitch-catch configuration.

Acoustic casing inspection tools may be of various configurations. Example configurations are shown in FIGS. 3 and 4. A casing inspection tool includes one or more transducers to direct an acoustic signal towards a well casing and detect an acoustic signal returning from the well casing. The transducers may be used as high amplitude transmitters to generate and direct acoustic energy towards the casing, and to detect energy that is reflected by the casing and other surrounding media. Based on this reflected energy, the tool determines a thickness of the casing (e.g., using an electronic processor of the tool to process the detected energy).

FIG. 3 depicts an implementation of a casing inspection tool having a one-transducer pulse-echo configuration 300. The transducer 302 includes an acoustic transmitter and an acoustic receiver. Acoustic energy 304 generated by the transducer 302 reflects from the interfaces of the well casing 306, and may reflect multiple times inside the casing 306, as shown by wave reverberation 308. Returning energy 310 is detected by the transducer 302.

FIG. 4 depicts an implementation of a casing inspection tool having a two-transducer pitch-catch configuration 400. The transducers include an acoustic transmitter 402 and an acoustic receiver 404. Acoustic energy 405 generated by the transducer 402 reflects from the interfaces of the well casing 406, and may reflect multiple times inside the casing 406, as shown by wave reverberation 408. Returning energy 410 is detected by the receiver 404.

Figure 5:
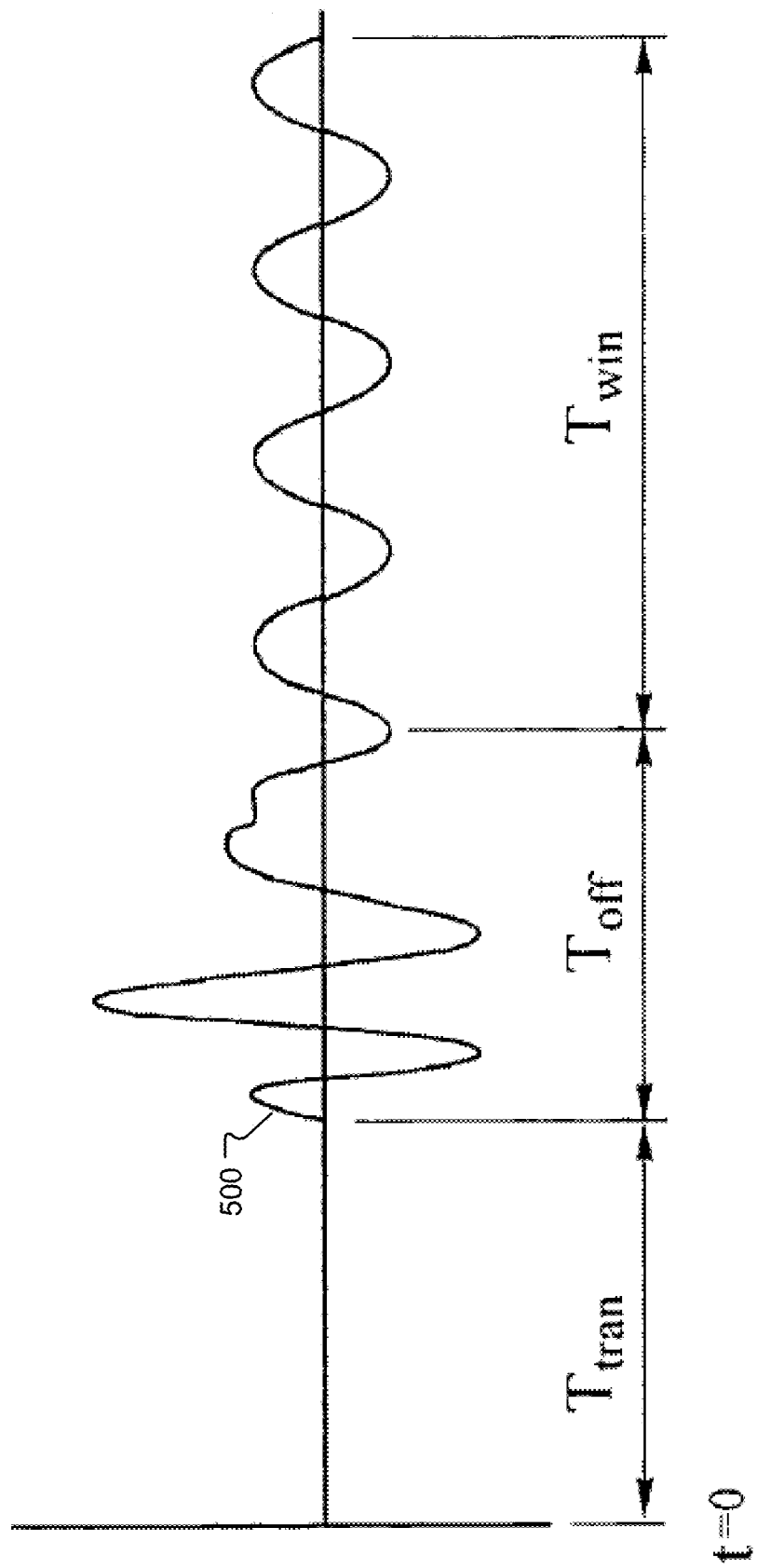
FIG. 5 shows a typical waveform recorded by a pulse-echo configuration.

The thickness of the casing may be determined using the frequency content of the recorded waveforms. FIG. 5 illustrates a typical waveform 500 recorded by a pulse-echo configuration, e.g., the pulse-echo configuration 300 of FIG. 3. The reverberation part of the waveform (within the time window $T_{win}$) comes from the waves being reflected multiple times inside the casing. The peak frequency of the casing reverberations is related to the casing thickness in the way that the casing thickness is equal to one half (or any integer multiple of one half) of the wavelength of the wave oscillating at this peak frequency. Therefore, the casing thickness may be calculated by measuring the peak frequency. However, the accuracy of the frequency measurement may be limited by many factors, such as the recording length of the waveform, the resolution of frequency, the transducer's firing frequency, and other factors. These factors may affect the accuracy of the casing thickness measurement. For example, for thick casings, the peak frequency may become very low. Low frequency acoustic waves have a long wavelength, so a long distance is needed between the transducer and the casing wall. However, in a cased borehole, this distance is limited by the casing diameter. For small diameters the transducer-casing distance will be small. Therefore, there will be less time to record the first reflection and the following reverberations before the second reflection arrives.

The correlation between the measured waveform and a model waveform may be used to improve the accuracy of the thickness estimate of the well casing, and to reduce or eliminate the necessity of using low frequency acoustic waves for thick casings. This correlation determination may provide an accurate casing thickness estimate, as the relative time delay of each reverberation between the two interfaces of the casing is solely determined by the casing thickness, and is mostly independent of the impedance of the cement behind the casing. In addition, in applications related to oil field construction and exploration, a well casing may be made of steel, which has higher acoustic impedance than both the borehole fluid and the cement.

The accuracy of thickness measurement may be essential for further evaluation of cement bonding behind the casing, which is critical for the safety and economy of oil field operation. Conventional technologies for cement bonding evaluation are primarily designed for casings thinner than 1 inch. However, in oil fields where tectonic movements are active, thick casings are installed in the oil wells, often in excess of 1 inch. The correlation between the measured waveform and a model waveform can be used to evaluate casings thicker than 1 inch.

This correlation method uses the same signal pulse in the model as the one used by the measurement. This may be achieved in various ways. In some implementations, the first reflection (defined by $T_{off}$ in FIG. 5) from the casing's inner wall is used as a reference to calculate the entire waveform. In some implementations, the pre-measurement reflection is used as the reference. As mentioned above, the casing thickness estimate is largely independent of the impedance values of both inner fluid and the cement, which are assumed to be less than the impedance of the steel casing.

Figure 6:
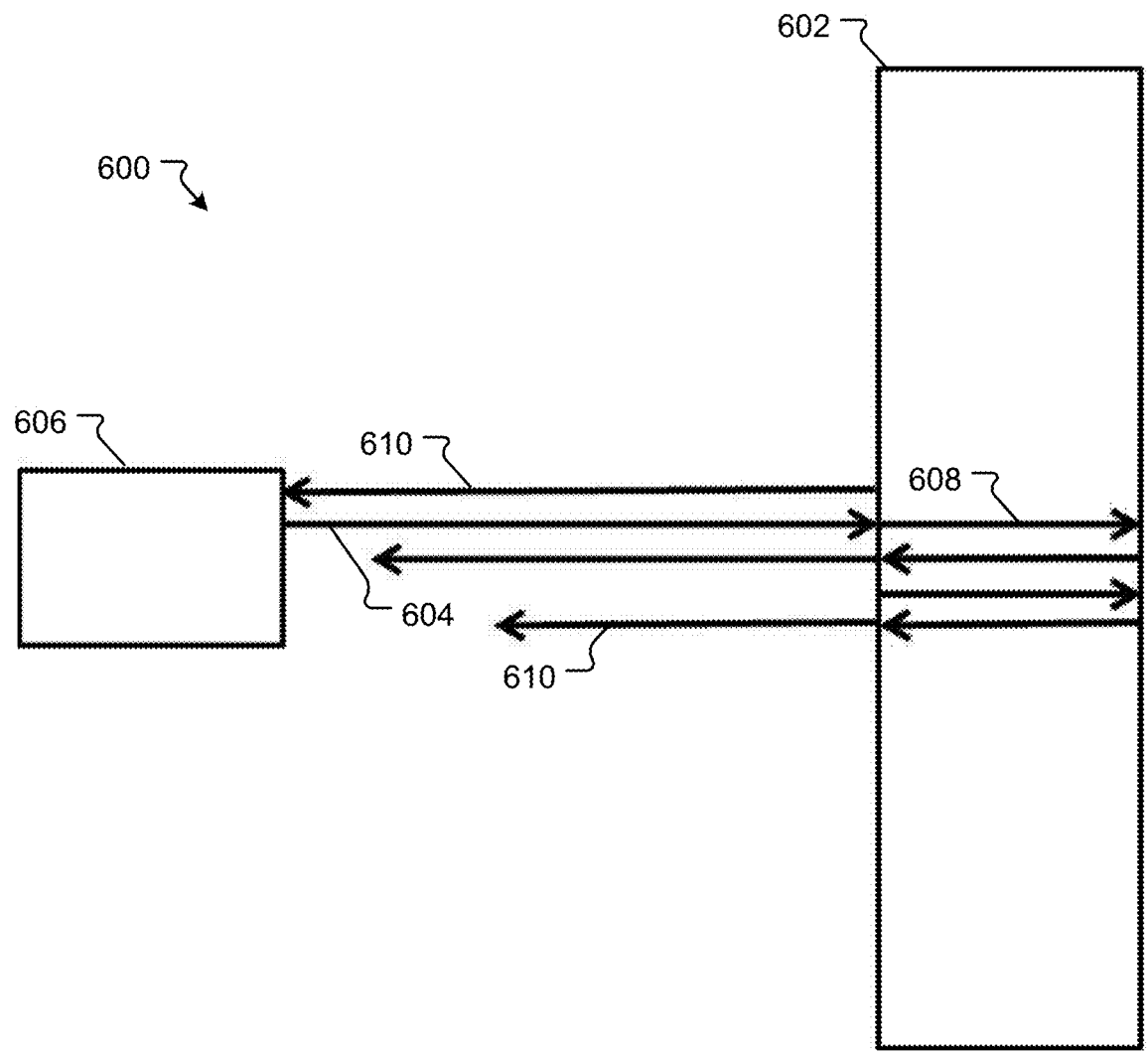
FIG. 6 shows an example of a plane wave model.

Several model waveforms may be calculated for many assumed or estimated casing thicknesses. Model waveforms may be calculated in various ways. For instance, in some implementations, model waveforms are calculated according to a plane wave model 600, as shown in FIG. 6. In the plane wave model 600, the casing 602 is simplified as a flat plate. Acoustic waves 604 generated by a transducer 606 reflects from the surfaces of the well casing 602, and may reflect multiple times inside the casing 602, as shown by wave reverberation 608. Returning waves 610 are detected by the transducer 606. The waves are all assumed to be plane waves. The waves are incident perpendicularly to the surfaces of the casing 602.

In some implementations, model waveforms may be calculated using more advanced models that may include the effects of casing curvature, the transducer's radiation pattern, etc. For example, model waveforms may be calculated using a ray tracing model that accounts for beam spreading of the transducer and the curvature of the casing. In some implementations, a theoretical model of ultrasonic propagation is built using a particular tool configuration (for example, a pulse-echo configuration) with an assumed cement bonding impedance and casing thickness. The acoustic waves emitted from the transmitter are decomposed into many rays traveling to different directions. These rays are represented as plane waves. The magnitude of each ray is weighted according to its direction by the transducer's radiation pattern so that the beam spreading effect is taken into account.

For example, when a ray is in a medium corresponding to the borehole fluid, it is a pure compressional wave. When a ray reaches the inner wall of the casing, it is reflected and refracted according to the interface's boundary condition. The refracted waves will have both compressional and shear waves. Both compressional and shear waves can be converted into each other at either of the two interfaces of the casing. In some implementations, this wave may be converted at the interfaces between a compressional wave and a shear wave, and vice versa. In some implementations, the model may be simplified further by including only compressional waves in the analysis.

When the refracted waves travel inside the casing, they are reflected and refracted multiple times by both inner and outer walls of the casing. Some of the acoustic energy leaks into the cement and the rock formation around the borehole. Some acoustic waves are reflected back into the borehole fluid and recorded by the acoustic transducer. These reflected waves carry the information about the casing thickness and the acoustic impedance behind the casing. In one or more implementations, the reflections and refractions of each ray are traced (both the angles and magnitudes) at the curved casing walls. The incident angle, the reflection angles, and the refraction angles of each ray are calculated according to its travel direction and the effect of the casing curvature. By adding all the waves coming into the transducer, the model waveform can be calculated. Model waveforms calculated based on travel direction and casing curvature may be more accurate than model waveforms created using normal-incident plane-wave theory.

Figure 7:
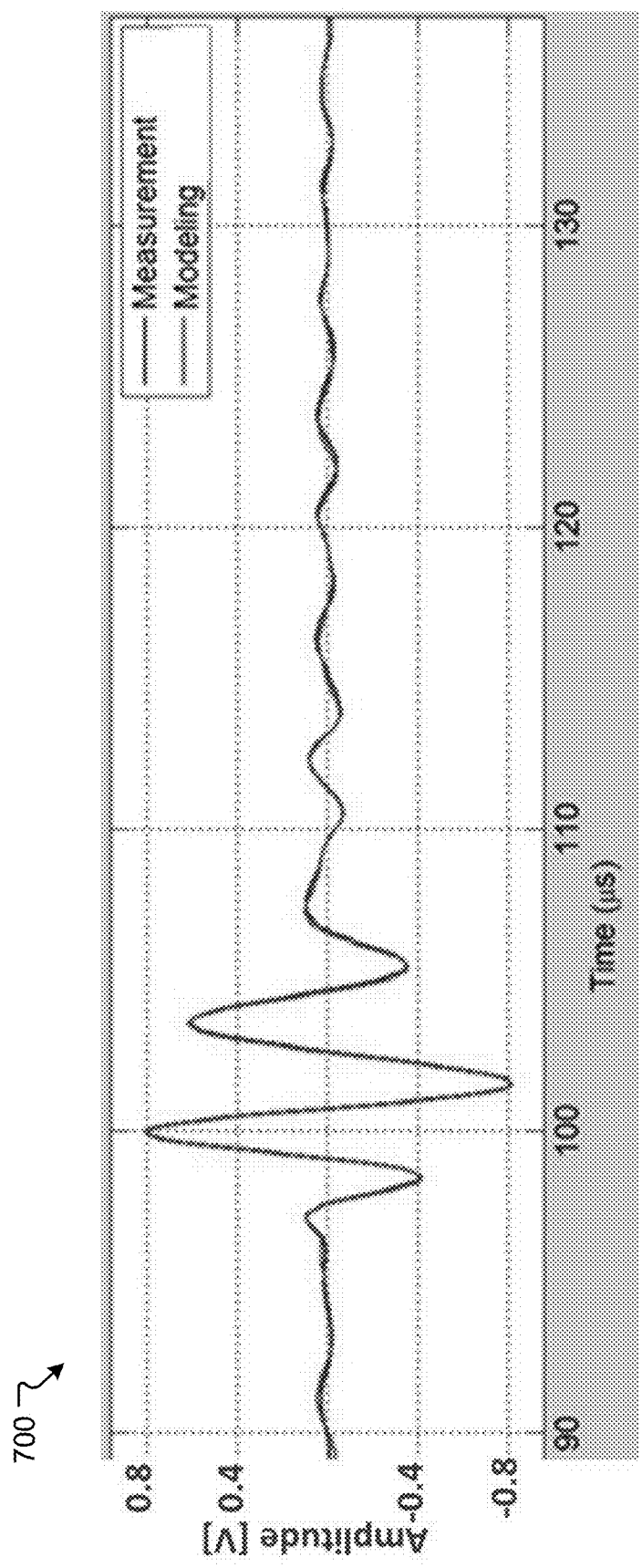
FIG. 7 shows an example of modeled and measured waves.

FIG. 7 shows a graph 700 of examples of a model waveform and a measured waveform. The correlation between the measured and model waveforms within the reverberation window for each assumed thickness may be calculated. The thickness corresponding to the maximum value of the correlation is the estimated casing thickness.

Figure 8:
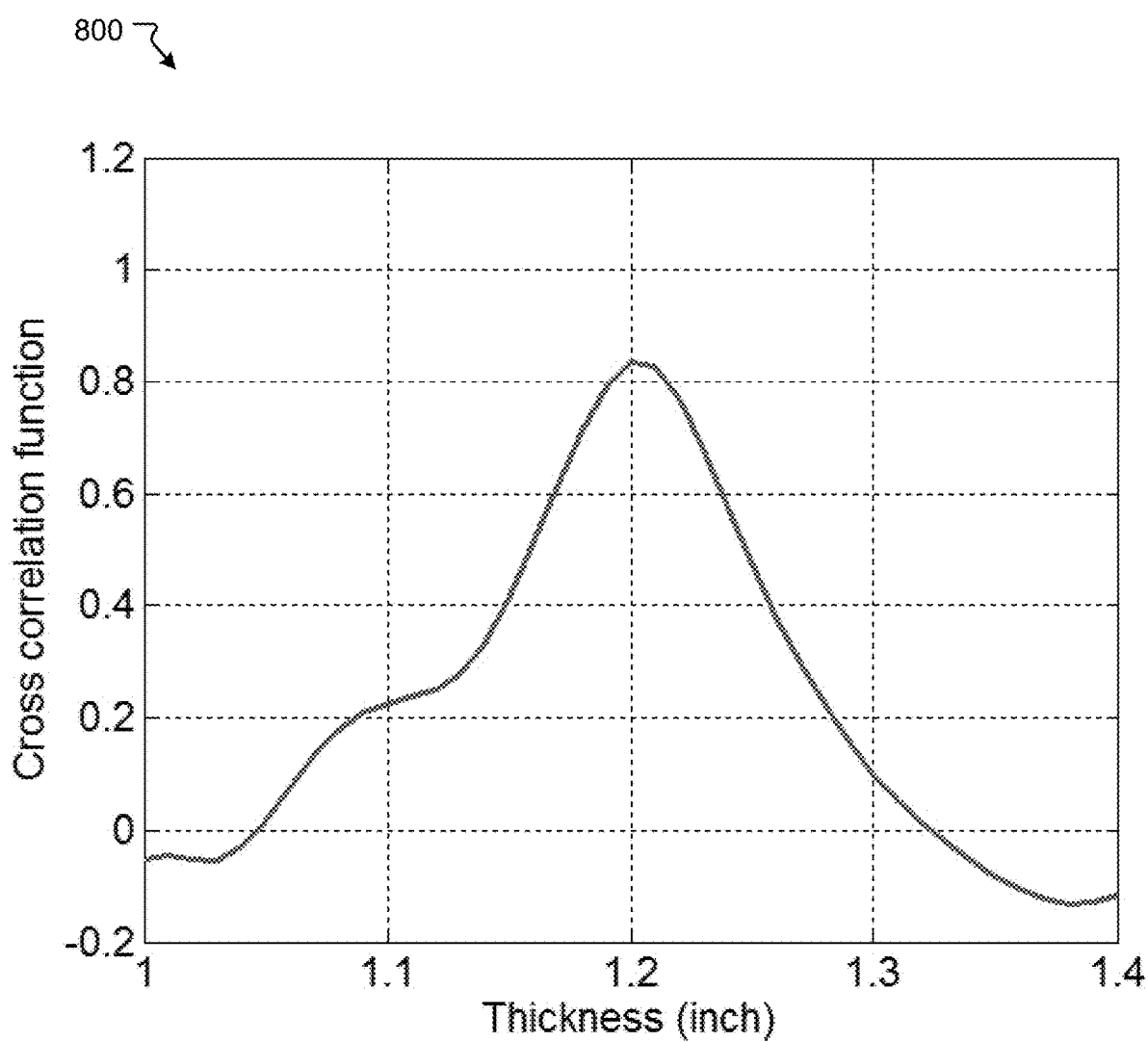
FIG. 8 shows an example of the cross-correlation as a function of assumed casing thickness.

In some implementations, the correlation of the model and measured waveforms is calculated by determining the cross-correlation of the model and measured waveforms. FIG. 8 shows a graph 800 of an example of the cross-correlation as a function of assumed casing thickness. The true (i.e., measured) casing thickness is 1.2 inches in this example, and the cross-correlation shows a peak at that value in the plot as well. In some implementations, the correlation of the model and measured waveforms is calculated by finding the difference of the two as a function of assumed casing thickness. The thickness corresponding to the minimum difference is the estimated casing thickness.

Figure 9:
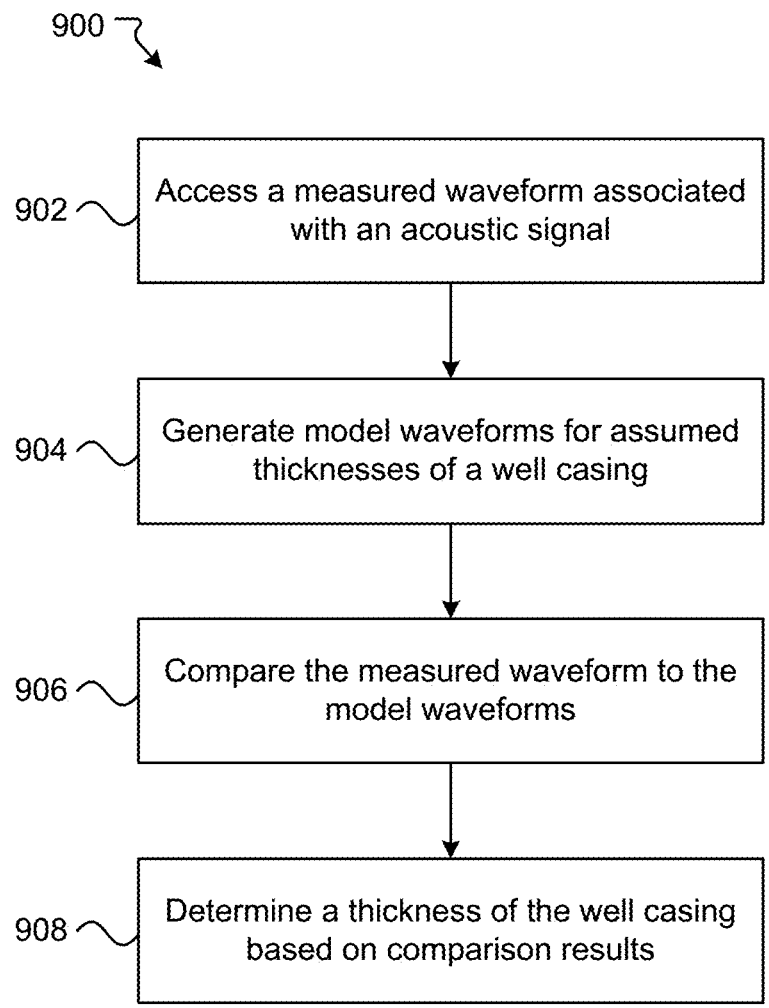
FIG. 9 is a flowchart showing an example technique for measuring the thickness of a well casing of a well structure.

FIG. 9 is a flowchart showing an example process 900 for determining a thickness of a well casing. Some or all of the operations in the process 900 can be implemented by one or more computing devices. For example, the process 900 can be implemented by the computing subsystem 110 in FIG. 1A, the computing system 200 in FIG. 2, or by another type of system.

Some or all of the operations in the process 900 can be implemented by one or more computing devices that are embedded with, or otherwise operated in connection with, a logging tool. For example, the process 900 can be implemented in connection with the logging tool 102 in FIG. 1A, the casing evaluation tools in FIGS. 3 and 4, or another type of tool. The casing evaluation tool may include an acoustic transmitter to transmit acoustic energy to a well casing. The casing evaluation tool may include an acoustic receiver to detect acoustic energy returning via the well casing. The transmitter and receiver can be operated within a wellbore that includes a well casing.

In some implementations, the process 900 may include additional, fewer, or different operations performed in the order shown in FIG. 9, or in a different order. Moreover, one or more of the individual operations or subsets of the operations in the process 900 can be performed in isolation, or as part of another process. Output data generated by the process 900, including output data generated by intermediate operations, can include stored, displayed, printed, transmitted, communicated or processed information.

In some implementations, some or all of the operations in the process 900 are executed in real time during a drilling operation or another type of operation performed in a well system. An operation can be performed in real time, for example, by performing the operation in response to receiving data (e.g., from a sensor or monitoring system) without substantial delay. An operation can be performed in real time, for example, by performing the operation while monitoring for additional data. Some real time operations can receive an input and produce an output during drilling operations; in some instances, the output is made available within a time frame that allows an operator (e.g., a human or machine operator) to respond to the output, for example, by modifying the drilling operation.

In some implementations, a casing evaluation tool can be placed in a wellbore defined in a subterranean region that includes multiple subsurface layers. For example, the casing evaluation tool can be the logging tool 102 shown in FIG. 1A. The casing evaluation tool can be transported by a drilling assembly, by a wireline logging assembly, or other hardware. The casing evaluation tool can be operated at multiple tool depths in the wellbore, and each tool depth can represent a different logging point. The process 900 can be executed based on data for a single logging point or multiple logging points.

At 902, a measured waveform associated with an acoustic signal returned via a well casing based on operating an acoustic transmitter and an acoustic receiver within a wellbore that includes the well casing is accessed.

At 904, model waveforms for assumed thicknesses are generated based on a reflection of the acoustic signal, a radiation pattern of the acoustic transmitter, a curvature of the well casing, or a combination. Each model waveform corresponds to a different assumed or estimated thickness of the well casing. In some implementations, the model waveforms may correspond to an assumed well casing thickness greater than 1 inch.

At 906, the measured waveform is compared to the model waveforms. Comparing the measured waveform to the model waveforms may include determining correlations between a portion of the measured waveform and a portion of each of the model waveforms. The portion of the measured waveform and the portion of each of the model waveforms may correspond to a reverberation window of the measured waveform. In some implementations, determining correlations may include determining cross-correlations between the measured waveform and the model waveforms. In some implementations, determining correlations may include determining differences between the measured waveform and the model waveforms.

At 908, a thickness of the well casing is determined based on results of comparing the measured waveform and the plurality of model waveforms. In some implementations, the thickness corresponding to the maximum value of the correlation is the estimated casing thickness. In implementations where differences between the measured waveform and the model waveforms are determined, the thickness of the well casing may be determined by determining a thickness corresponding to a model waveform that corresponds to a minimum difference between the measured waveform and the model waveforms.

The techniques described above can be implemented in digital electronic circuitry, or in computer software, firmware, or hardware, including the structures disclosed in this specification and their structural equivalents, or in combinations of one or more of them. For example, an electronic processor may be used to control acoustic transmitters and receivers (e.g., by sending electronic command signals) in order to direct an acoustic signal towards a casing and detect an acoustic signal returning from the pipe. In another example, the electronic processor may be used to analyze and process data, for instance to determine a thickness of the casing using one or more of the techniques described above.

The term "electronic processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple implementations separately or in any suitable subcombination.

A number of implementations have been described. Nevertheless, it will be understood that other implementations are also possible. For example, the method may include fewer steps than those illustrated or more steps than those illustrated. In addition the steps may be performed in the respective order or in different orders than illustrated.

In one general aspect, a thickness of the well casing is determined based on results of comparing the measured waveform and the plurality of model waveforms.

In some aspects, a measured waveform associated with an acoustic signal returned via a well casing is accessed based on operating an acoustic transmitter and an acoustic receiver within a wellbore comprising the well casing. The measured waveform is compared to a plurality of model waveforms. Each of the plurality of model waveforms corresponds to a different thickness of the well casing. A thickness of the well casing is determined based on results of comparing the measured waveform and the plurality of model waveforms.

Implementations of these and other aspects may include one or more of the following features. Comparing the measured waveform to the plurality of model waveforms includes determining correlations between at least a portion of the measured waveform and at least a portion of each of the plurality of model waveforms. At least a portion of the measured waveform corresponds to a reverberation window of the measured waveform. Determining the correlations between the at least a portion of the measured waveform and the at least a portion of each of the plurality of model waveforms includes determining cross-correlations between the at least a portion of the measured waveform and the at least a portion of each of the plurality of model waveforms. Determining the correlations between the at least a portion of the measured waveform and the at least a portion of each of the plurality of model waveforms includes determining differences between the at least a portion of the measured waveform and the at least a portion of each of the plurality of model waveforms. Determining the thickness of the well casing includes determining a thickness corresponding to a model waveform of the plurality of model waveforms corresponding to a minimum difference of the determined differences.

Additionally or alternatively, implementations of these and other aspects may include one or more of the following features. The plurality of model waveforms for a plurality of assumed thicknesses are generated based on one or more of (i) a reflection of the acoustic signal, (ii) a radiation pattern of the acoustic transmitter, and (iii) a curvature of the well casing. Determining the thickness of the well casing includes determining the thickness of the well casing in real time during drilling operations or wireline logging operations.

In some aspects, a system includes an acoustic transmitter-receiver pair to be disposed within an interior portion of a well casing, and a computing system coupled with the acoustic transmitter-receiver pair. The computing system is configured to access a measured waveform associated with an acoustic signal returned via the well casing based on operating an acoustic transmitter and an acoustic receiver within a wellbore comprising the well casing and compare the measured waveform to a plurality of model waveforms.

Each of the plurality of model waveforms corresponds to a different thickness of the well casing. The computing system is configured to determine a thickness of the well casing based on results of comparing the measured waveform and the plurality of model waveforms.

Implementations of these and other aspects may include one or more of the following features. The computing system is configured to determine correlations between at least a portion of the measured waveform and at least a portion of each of the plurality of model waveforms. At least a portion of the measured waveform corresponds to a reverberation window of the measured waveform. The computing system is configured to determine cross-correlations between the at least a portion of the measured waveform and the at least a portion of each of the plurality of model waveforms. The computing system is configured to determine differences between the at least a portion of the measured waveform and the at least a portion of each of the plurality of model waveforms, and to determine the thickness of the well casing comprises the computing system to determine a thickness corresponding to a model waveform of the plurality of model waveforms corresponding to a minimum difference of the determined differences.

Additionally or alternatively, implementations of these and other aspects may include one or more of the following features. The computing system is configured to generate the plurality of model waveforms for a plurality of assumed thicknesses based on one or more of (i) a reflection of the acoustic signal, (ii) a radiation pattern of the acoustic transmitter, and (iii) a curvature of the well casing. The computing system is configured to determine the thickness of the well casing in real time during drilling operations or wireline logging operations.

Other implementations are within the scope of the following claims.

What is claimed is:

1. A method comprising:
   disposing a tool in a wellbore;
   directing an acoustic signal towards a well casing in the wellbore, the acoustic signal generated by an acoustic transmitter of the tool;
   accessing a measured waveform associated with an acoustic signal returned via the well casing based on operating an acoustic receiver of the tool within the wellbore comprising the well casing;
   comparing the measured waveform to a plurality of model waveforms, wherein each of the plurality of model waveforms corresponds to a different thickness of the well casing;
   determining, by operation of data processing apparatus, a thickness of the well casing based on results of comparing the measured waveform and the plurality of model waveforms; and
   assessing damage to the well casing based on the determined thickness of the well casing.

2. The method of claim 1, wherein comparing the measured waveform to the plurality of model waveforms comprises determining correlations between at least a portion of the measured waveform and at least a portion of each of the plurality of model waveforms.

3. The method of claim 2, wherein the at least a portion of the measured waveform corresponds to a reverberation window of the measured waveform.

4. The method of claim 2, wherein determining the correlations between the at least a portion of the measured waveform and the at least a portion of each of the plurality of model waveforms comprises determining cross-correlations between the at least a portion of the measured waveform and the at least a portion of each of the plurality of model waveforms.

5. The method of claim 2, wherein:
determining the correlations between the at least a portion of the measured waveform and the at least a portion of each of the plurality of model waveforms comprises determining differences between the at least a portion of the measured waveform and the at least a portion of each of the plurality of model waveforms; and
determining the thickness of the well casing comprises determining a thickness corresponding to a model waveform of the plurality of model waveforms corresponding to a minimum difference of the determined differences.

6. The method of claim 1, further comprising:
generating the plurality of model waveforms for a plurality of assumed thicknesses based on one or more of (i) a reflection of the acoustic signal, (ii) a radiation pattern of the acoustic transmitter, and (iii) a curvature of the well casing.

7. The method of claim 1, wherein determining the thickness of the well casing comprises determining the thickness of the well casing in real time during drilling operations or wireline logging operations.

8. A non-transitory computer-readable medium encoded with instructions that, when executed by data processing apparatus, cause the data processing apparatus to perform operations comprising:
accessing a measured waveform associated with an acoustic signal returned via a well casing based on operating an acoustic transmitter and an acoustic receiver of a tool disposed within a wellbore comprising the well casing, the acoustic transmitter generating an acoustic signal directed towards the well casing;
comparing the measured waveform to a plurality of model waveforms, wherein each of the plurality of model waveforms corresponds to a different thickness of the well casing;
determining a thickness of the well casing based on results of comparing the measured waveform and the plurality of model waveforms; and
assessing damage to the well casing based on the determined thickness of the well casing.

9. The non-transitory computer-readable medium of claim 8, wherein comparing the measured waveform to the plurality of model waveforms comprises determining correlations between at least a portion of the measured waveform and at least a portion of each of the plurality of model waveforms.

10. The non-transitory computer-readable medium of claim 9, wherein the at least a portion of the measured waveform corresponds to a reverberation window of the measured waveform.

11. The non-transitory computer-readable medium of claim 9, wherein determining the correlations between the at least a portion of the measured waveform and the at least a portion of each of the plurality of model waveforms comprises determining cross-correlations between the at least a portion of the measured waveform and the at least a portion of each of the plurality of model waveforms.

12. The non-transitory computer-readable medium of claim 9, wherein:
determining the correlations between the at least a portion of the measured waveform and the at least a portion of each of the plurality of model waveforms comprises determining differences between the at least a portion of the measured waveform and the at least a portion of each of the plurality of model waveforms; and
determining the thickness of the well casing comprises determining a thickness corresponding to a model waveform of the plurality of model waveforms corresponding to a minimum difference of the determined differences.

13. The non-transitory computer-readable medium of claim 8, further comprising generating the plurality of model waveforms for a plurality of assumed thicknesses based on one or more of (i) a reflection of the acoustic signal, (ii) a radiation pattern of the acoustic transmitter, and (iii) a curvature of the well casing.

14. The non-transitory computer-readable medium of claim 8, wherein determining the thickness of the well casing comprises determining the thickness of the well casing in real time during drilling operations or wireline logging operations.

15. A system comprising:
an acoustic transmitter-receiver pair of a tool to be disposed within a wellbore comprising a well casing, the acoustic transmitter generating an acoustic signal and transmitting the acoustic signal towards the well casing; and
a computing system coupled with the acoustic transmitter-receiver pair, the computing system is configured to:
access a measured waveform associated with an acoustic signal returned via the well casing based on operating the acoustic receiver of the tool within an interior portion of the well casing;
compare the measured waveform to a plurality of model waveforms, wherein each of the plurality of model waveforms corresponds to a different thickness of the well casing;
determine a thickness of the well casing based on results of comparing the measured waveform and the plurality of model waveforms; and
assessing damage to the well casing based on the determined thickness of the well casing.

16. The system of claim 15, wherein the computing system is configured to:
compare the measured waveform to the plurality of model waveforms; and
determine correlations between at least a portion of the measured waveform and at least a portion of each of the plurality of model waveforms.

17. The system of claim 16, wherein the at least a portion of the measured waveform corresponds to a reverberation window of the measured waveform.

18. The system of claim 16, wherein the computing system is configured to:
determine the correlations between the at least a portion of the measured waveform and the at least a portion of each of the plurality of model waveforms; and
determine cross-correlations between the at least a portion of the measured waveform and the at least a portion of each of the plurality of model waveforms.

19. The system of claim 16, wherein the computing system is configured to:
determine the correlations between the at least a portion of the measured waveform and the at least a portion of each of the plurality of model waveforms;
determine differences between the at least a portion of the measured waveform and the at least a portion of each of the plurality of model waveforms; and
determine the thickness of the well casing comprises the computing system is configured to determine a thickness corresponding to a model waveform of the plurality of model waveforms corresponding to a minimum difference of the determined differences.

20. The system of claim 15, wherein the computing system is configured to generate the plurality of model waveforms for a plurality of assumed thicknesses based on one or more of (i) a reflection of the acoustic signal, (ii) a radiation pattern of the acoustic transmitter, and (iii) a curvature of the well casing.

21. The system of claim 15, wherein the computing system is configured to determine the thickness of the well casing in real time during drilling operations or wireline logging operations.

* * * * *